US012609515B2

(12) United States Patent
Winnie

(10) Patent No.: US 12,609,515 B2
(45) Date of Patent: Apr. 21, 2026

(54) T-SHAPED JUNCTION BOX WITH CLIPS

(71) Applicant: Jonathan Winnie, Lake Zurich, IL (US)

(72) Inventor: Jonathan Winnie, Lake Zurich, IL (US)

(73) Assignee: WINNIE INDUSTRIES LLC—WINNIE INDUSTRIES LP, Rolling Meadows, IL (US)

( * ) Notice: Subject to any disclaimer, the term of this patent is extended or adjusted under 35 U.S.C. 154(b) by 167 days.

(21) Appl. No.: 18/423,620

(22) Filed: Jan. 26, 2024

(65) Prior Publication Data

US 2025/0246888 A1 Jul. 31, 2025

(51) Int. Cl.
  H02G 3/08 (2006.01)
  H02G 3/32 (2006.01)
(52) U.S. Cl.
  CPC ................................... H02G 3/085 (2013.01)

(58) Field of Classification Search
  CPC ............ H02G 3/32; H02G 3/085; H02G 3/06; H02G 3/0616; H02G 3/0691
  See application file for complete search history.

(56) References Cited

U.S. PATENT DOCUMENTS

| | | | |
|---|---|---|---|
| 7,022,912 B1 * | 4/2006 | Kilburn | H02G 3/105 174/58 |
| 2012/0067612 A1 * | 3/2012 | Wagner | H02G 3/081 174/51 |
| 2014/0150218 A1 * | 6/2014 | Colangelo | H02G 3/12 24/570 |
| 2019/0058315 A1 | 2/2019 | Korcz et al. | |
| 2021/0281056 A1 * | 9/2021 | Oh | H02G 3/20 |
| 2023/0216285 A1 | 7/2023 | Winnie | |
| 2024/0258780 A1 * | 8/2024 | Witherbee | F16B 5/0208 |

* cited by examiner

*Primary Examiner* — Amol H Patel
(74) *Attorney, Agent, or Firm* — William Gray Mitchell

(57) ABSTRACT

The invention is gap junction box with clips comprising a three-dimensional T-shape attached to a clip bar comprising at least two clip bodies, enabling installation in a standard electrical circuit raceway without requiring the bending or moving of conduit lines and securing of conduit lines in close proximity to the junction box.

2 Claims, 5 Drawing Sheets

FIG. 5

| 1. Fit one or more knockout holes over one or more corresponding base conduits of an electrical conduit raceway such that the portions of the box containing additional knockout holes are raised above the raceway conduits |
|---|

| 2. Clip each clip body in an electrical raceway conduit |
|---|

| 3. Attach a first end of a ground wire to the ground wire attachment |
|---|

| 4. Accessing one or more of such additional knockout holes without bending or otherwise adjusting the box or the base conduit lines |
|---|

| 5. Optionally, secure one or more conduit lines emanating from a knockout hole(s) within one or both clip bodies |
|---|

T-SHAPED JUNCTION BOX WITH CLIPS

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a gap junction box for electrical wiring that stands out from a conduit raceway, enabling a user to access all box cutouts.

Background of the Invention

As long as buildings have comprised electrical power lines, there has been a need to organize electrical wiring and insulate that wiring from inadvertent physical touching, as well from various types of corrosion, such as heat, humidity and liquid water. Over time, electrical conduit construction and installation became regulated under the National Electrical Code (NEC), which is intended to protect people and property from hazards related to electrical wiring, especially fire.

Today, the organization of electrical wiring usually comprises a system of enclosed conduits through which the wires can run, often known as a "raceway" since its appearance is similar to a road system. It is desirable for the conduits to be protective in nature, especially against water, and also to provide a measure of fireproofing should the wires within ignite. Preferred materials for raceway conduits include, but are not limited to, PVC piping or similar nonmetallic materials, galvanized steel or flexible metal conduits (FMC). These materials have different properties and are thus used primarily in specific settings. For example, galvanized steel may the best choice for a highly corrosive atmosphere, while FMCs may be best for a structure that is likely to move or shift. Electrical conduit raceways may be located wherever required, including behind walls, above ceilings or below floors. In utility areas, basements and attics, raceways are more likely to be exposed.

In addition to raceway conduits, junction boxes are also components, usually metal or plastic, within an electrical system where two or more electrical wires are connected. The boxes protect hot (black), neutral (white) and grounding (green or copper) wires as well as other wire colors. As with raceway conduits, the boxes and are intended to protect a building's electrical connections and allow wires to outflow to other fixture boxes. Currently available junction boxes are brick-shaped and seated within raceways such that, when the box contents need to be checked or serviced, the box must be removed or conduits altered to allow access to the box contents.

What is needed is a junction box that can be seated within an electrical raceway and connected to conduits, allowing access to the box contents without requiring removal or rearrangement of the conduits' pathways.

BRIEF SUMMARY

In a preferred embodiment, a gap junction box comprising a three-dimensional T-shape with an open top side, comprising a plurality of knockout holes, mounting holes and a ground wire attachment, such junction box attached to a clip bar comprising at least one clip body.

In a more preferred embodiment, the gap junction box as described herein, comprising two or more clip bodies.

In another preferred embodiment, the gap junction box as described herein, wherein each clip body is made of flexible material, preferably metal or plastic, and embodied as approximately U-shaped, with a central flat clip body base.

In another preferred embodiment, the gap junction box as described herein, wherein each clip body comprises an upper clip side and lower clip side, each with a clip body end emanating towards the center of the clip body.

In a separate preferred embodiment, a method of using the gap junction box as described herein, comprising the steps of: fitting one or more knockout holes over one or more corresponding base conduits of an electrical conduit raceway such that the portions of the box containing additional knockout holes are raised above the raceway conduits, clipping each clip body in an electrical raceway conduit; attaching a first end of a ground wire to the ground wire attachment; and accessing one or more of such additional knockout holes without bending or otherwise adjusting the box or the base conduit lines.

In another preferred embodiment, the method of use as described herein, further comprising the step of securing one or more conduit lines emanating from a knockout hole(s) within one or both clip bodies.

BRIEF DESCRIPTION OF THE DRAWINGS

FIG. 5 is a flow chart showing the steps of a method of use of the junction box with clips.

DETAILED DESCRIPTION OF THE INVENTION

The invention constitutes a gap junction box for electrical connections, designed with a "T-shape" and a clip bar with two clips for securing conduit lines, thus enabling the installer/user to fit the box within a standard raceway of electrical conduits in a ceiling or wall, such that the box will stick out from the conduit lines. As a result, a user will be able to access all knockout holes without having to bend or otherwise move the conduit lines. The purpose of the inventive box and clip bar is to secure the conduit raceway in an integrated fashion, creating a professional appearance and fully securing all conduits around the box.

By obviating the need to rearrange conduit lines, the inventive design will save time and labor costs for any property owner needing to install or access a junction box as part of an electrical wiring project, or any such person hiring and paying an electrician for such services.

The National Electric Code requires that conduits from a junction box be fully secured with a close proximity, e.g. 1-3 feet, from the box. The clip bar and clips attached to the inventive box accomplish the securing of the conduit lines to meet code. The box and clip design further eliminates any need to drop additional Unistrut for securing such conduit lines.

Additionally, the inventive box and clip design will decrease the need for hammer drilling to secure the assembly when the box is used on walls. In known usage, both a junction box and all points securing conduit lines must be independently drilled to the wall. The current design allows for drill attachment of the box only, while the attachment of the clip bar to the box fully secures the lines.

DETAILED DESCRIPTION OF THE DRAWINGS

Figure 1:
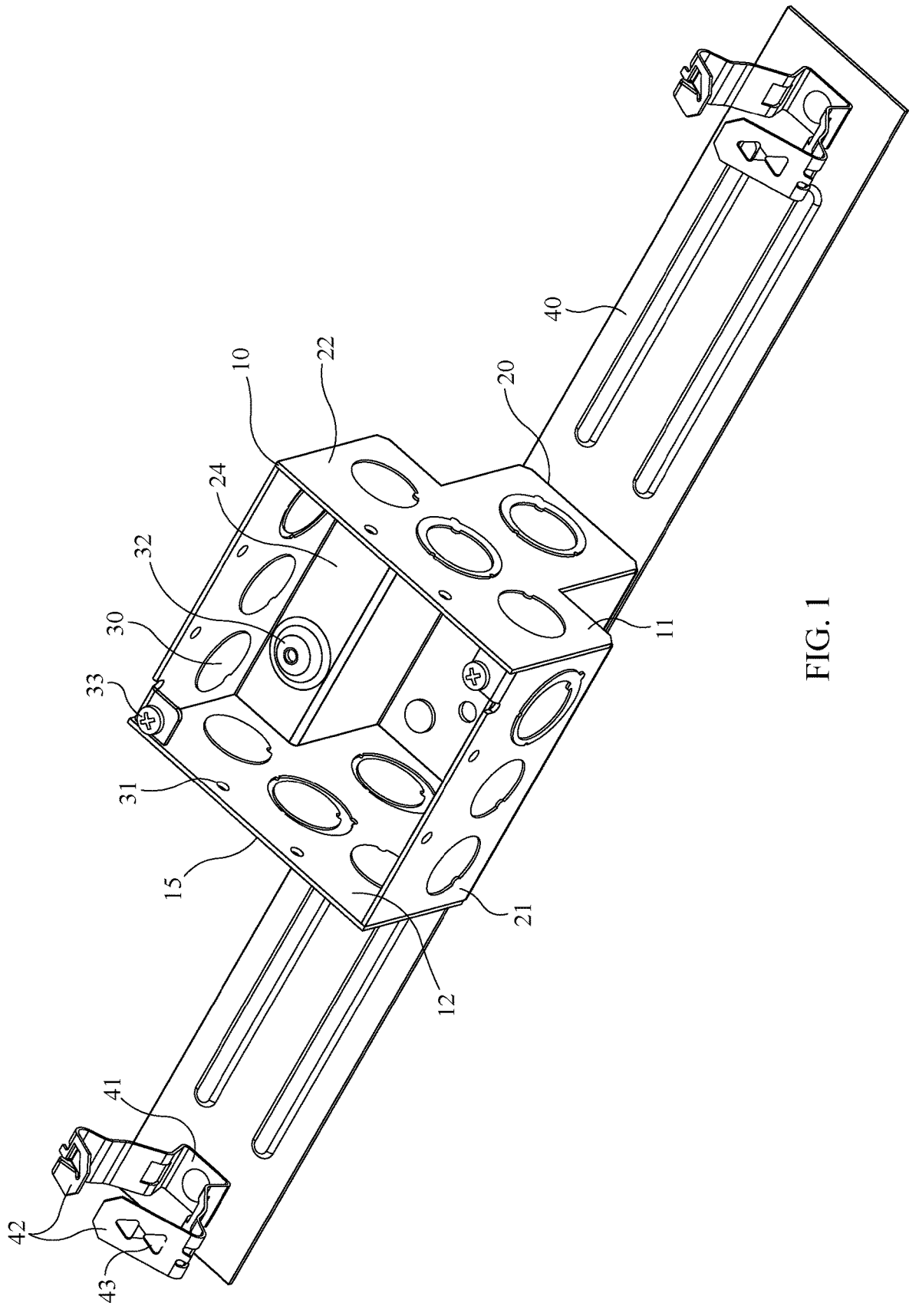
FIG. 1 is a line drawing evidencing a top perspective view of the inventive T-shaped junction box with clips.

FIG. 1 is a perspective view of the inventive T-shaped junction box 10, looking up into the open bottom of the box and showing the inner surface 12. The T-shape itself is comprised of a first wing 21 with a first shelf 23, a second wing 22 with a second shelf 24, each wing connected to a center post 20. The junction box is oriented such that the two ends 13 show the T-shape, while each of the two sides 14 include the sides of a wing and the center post.

Each of the sides and ends comprises a plurality of knockout holes 30, embodied as approximately circular areas that have been partially cut from the body of the box such that they may be pushed out with a tool or a user's thumb to enable electrical lines to enter and exit the box. In a preferred embodiment, based on the size of the junction box and whether it is residential or commercial in purpose, each knockout hole is between 0.5" and 4" in diameter. In a more preferred embodiment, for residential use, each knockout hole is 0.25" to 0.75" and for commercial use, each hole can be between 0.5" and 4". Knockout holes may optionally be left unopened if not needed. As drawn, each side comprises three knockout holes along the wing and each end comprises four knockout holes. In practice, the box may include as many knockout holes as practicable and as few as desired.

In addition, the body of the box comprises a plurality of mounting holes 31, sized to accommodate a mounting screw or bolt for attachment of the box to a ceiling, beam, or other point of attachment within a raceway. Cover screws 33 are also evident at the corners of the open top 15 for optional attachment of a flat cover piece (not pictured). In practice, the mounting holes would be sized for mounting screws 0.25" to 0.5" in diameter, although commercial application sizing may allow for even larger mounting screws.

Also pictured is the convex side of a ground wire attachment 32 on the second shelf, which is open to accommodate a ground wire screw (not pictured) when in use to down a ground wire, also known as a grounding pigtail wire (not pictured).

Finally, attached to the outer side of center post 20 is clip bar 40, embodied as a metallic elongated rectangle, which extends lengthwise from the junction box 10 in two directions. The clip body bar may be attached to the junction box by welding, with rivets, bolts or similar fasteners (not pictured) or with a commercially available adhesive.

Attached to each end of the clip bar 40 is a clip body 42, embodied as approximately a U-shape metallic component with two clip body ends 43, extending inward towards one another and capable of grabbing and holding a pipe or similar point of attachment in an electrical wiring racetrack. Preferably, the clip body is constructed of a somewhat flexible type of metal or plastic, which will allow for partial deformation to open around one or more conduit lines, then closing to capture such conduit line(s) within its U shape. Each clip body 42 also comprises a single, flat clip body base 41 in its center for attachment to the clip bar 40. Such clip body base may be attached to the clip body base by welding, with rivets, bolts or similar fasteners (not pictured) or with a commercially available adhesive. In an alternate embodiment, the clip bar may comprise more than two clip bodies.

Length of the clip bar and distance between the junction box and the clip bodies may vary depending on the situation. In a preferred embodiment, each clip body will be located on the clip bar between 6" and 18" from the junction box.

Figure 2:
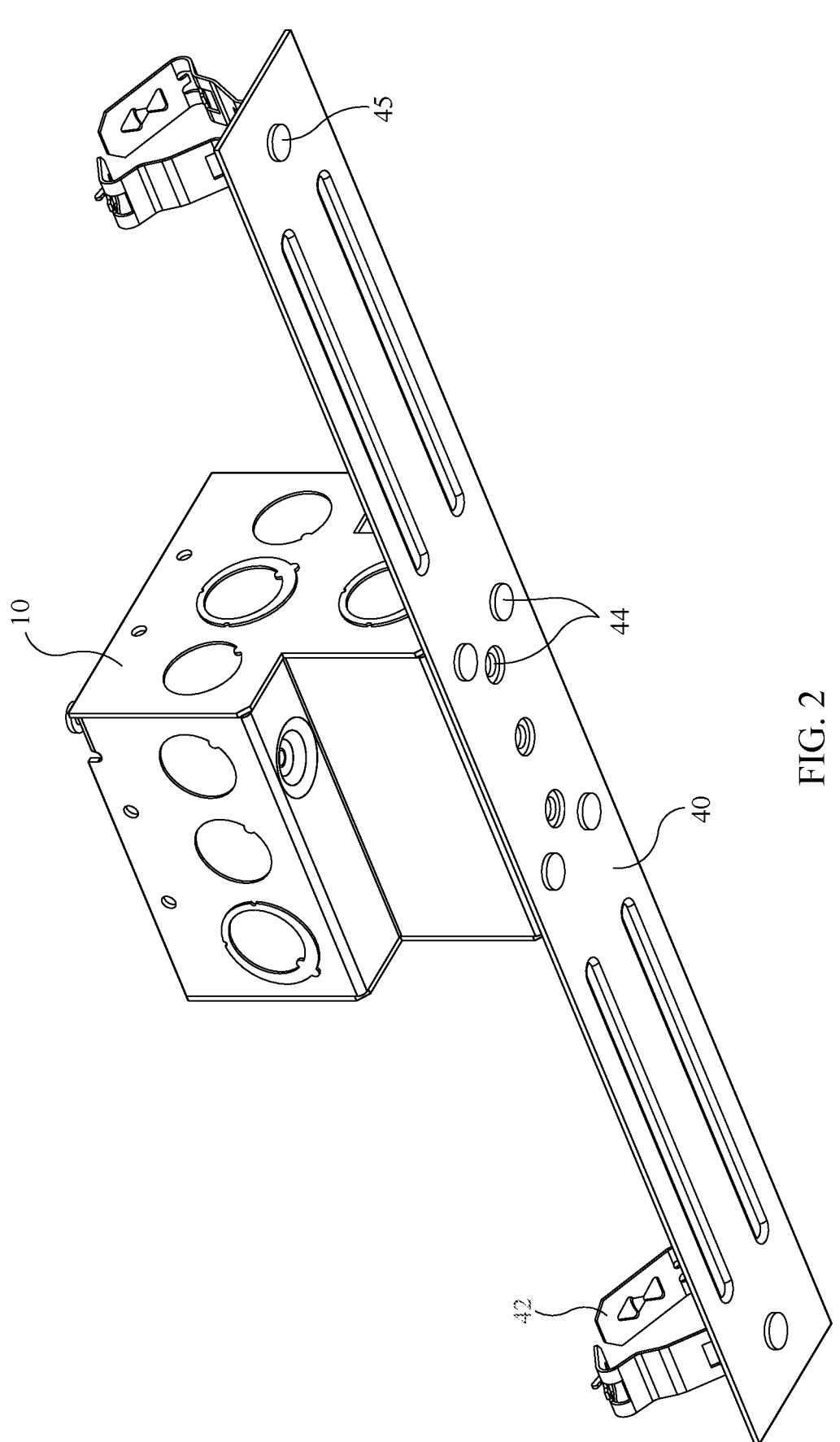
FIG. 2 is a line drawing evidencing a bottom perspective view of the junction box with clips of FIG. 1.

FIG. 2 is an alternate perspective view from above of the junction box with clips of FIG. 1, evidencing the same parts, notably junction box 10 and clip bar 40. In this view, junction box fasteners 44 are visible, attaching the junction box to the clip bar. Also visible are clip fasteners 45, attaching each clip body 42 to the clip bar 40. In each case the fasteners are embodied as threaded bolts.

Figure 3:
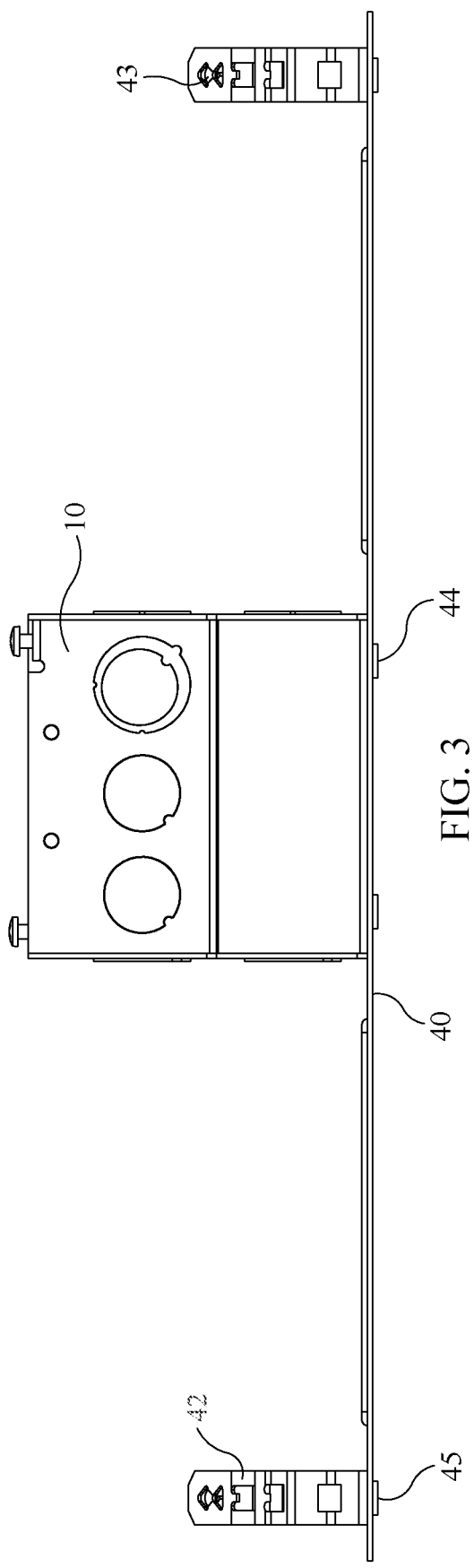
FIG. 3 is a line drawing evidencing an end view of the junction box with clips of FIG. 1.

FIG. 3 shows a side view of the junction box with clips of FIG. 1, showing the junction box 10 attached to one side of the clip bar 40 with junction box fasteners 44, and two clip bodies 42, each fastened to the clip bar with clip fasteners 45.

Figure 4:
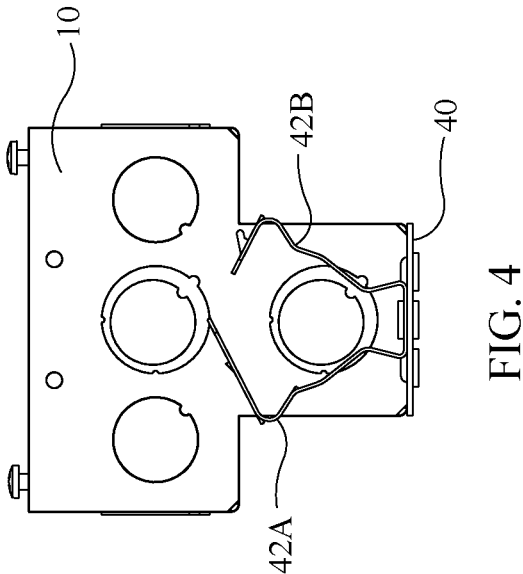
FIG. 4 is a line drawing evidencing a side view of the junction box with clips of FIG. 1.

FIG. 4 shows an end view of the junction box with clips of FIG. 1. In the embodiment of FIG. 4, junction box 10 and clip body 42 are shown attached to clip bar 40, and the clip body has an upper clip body side 42A and lower clip body side 42B, wherein the asymmetric sides provide the clip with more the capacity to grab a larger bundle of conduit lines.

FIG. 5 is a flow chart showing the steps of a method of use of the junction box with clips. Such steps comprise:

fitting one or more knockout holes over one or more corresponding base conduits of an electrical conduit raceway such that the portions of the box containing additional knockout holes are raised above the raceway conduits, clipping each clip body in an electrical raceway conduit;

attaching a first end of a ground wire to the ground wire attachment;

accessing one or more of such additional knockout holes without bending or otherwise adjusting the box or the base conduit lines; and, optionally securing one or more conduit lines emanating from a knockout hole(s) within one or both clip bodies.

INVENTION COMPONENTS

10 Junction box
11 Outer surface
12 Inner surface
13 End
14 Side
15 Open top
20 Center Post
21 First wing
22 Second wing
23 First shelf 24 Second shelf
30 Knockout holes
31 Mounting holes
32 Ground wire attachment
33 Cover screws
40 Clip bar
41 Clip body base
42 Clip body
42A Upper clip side
42B Lower clip side
43 Clip body ends
44 Junction box fasteners
45 Clip fasteners The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A method of using a gap junction box gap junction box comprising a three-dimensional T-shape with an open top side, comprising a plurality of knockout holes, mounting holes and a ground wire attachment, such junction box attached to a clip bar comprising at least one clip body, comprising the steps of:
   1. Fitting one or more knockout holes over one or more corresponding base conduits of an electrical conduit raceway such that the portions of the box containing additional knockout holes are raised above the raceway conduits,
   2. Clipping each clip body in an electrical raceway conduit;
   3. Attaching a first end of a ground wire to the ground wire attachment; and
   4. Accessing one or more of such additional knockout holes without bending or otherwise adjusting the box or the base conduit lines.
2. The method of claim 1, further comprising the step of:
   5. Securing one or more conduit lines emanating from a knockout hole(s) within one or both clip bodies.

* * * * *